(12) United States Patent
Hirano et al.

(10) Patent No.: US 12,382,157 B2
(45) Date of Patent: Aug. 5, 2025

(54) LIGHT EMITTING DEVICE, RANGE-IMAGE CAPTURING DEVICE, AND MONITORING DEVICE

(71) Applicant: KOITO MANUFACTURING CO., LTD., Tokyo (JP)

(72) Inventors: Tomiharu Hirano, Shizuoka (JP); Tomokazu Murakami, Shizuoka (JP); Toshiyuki Nakamura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 12 days.

(21) Appl. No.: 18/681,468

(22) PCT Filed: Aug. 5, 2022

(86) PCT No.: PCT/JP2022/030134
§ 371 (c)(1),
(2) Date: Feb. 5, 2024

(87) PCT Pub. No.: WO2023/013770
PCT Pub. Date: Feb. 9, 2023

(65) Prior Publication Data
US 2024/0340518 A1    Oct. 10, 2024

(30) Foreign Application Priority Data
Aug. 6, 2021 (JP) ................. 2021-129919

(51) Int. Cl.
*H04N 23/56* (2023.01)
*G01S 7/481* (2006.01)
(Continued)

(52) U.S. Cl.
CPC ........... *H04N 23/56* (2023.01); *G01S 7/4815* (2013.01); *G01S 17/89* (2013.01); *G06T 7/521* (2017.01); *G06T 2207/10028* (2013.01)

(58) Field of Classification Search
CPC ....... H04N 23/56; G01S 7/4815; G01S 17/89; G01S 7/481; G01S 7/4813; G01S 17/42;
(Continued)

(56) References Cited

U.S. PATENT DOCUMENTS

2007/0057209 A1\* 3/2007 Kurihara ................. H10F 39/80
250/559.38
2016/0216208 A1 7/2016 Kim et al.
(Continued)

FOREIGN PATENT DOCUMENTS

CN    107003245 A    8/2017
EP    3798672 A1     3/2021
(Continued)

OTHER PUBLICATIONS

European Extended Search Report issued Nov. 12, 2024 by the European Patent Office for EP Patent Application No. 22853188.5.
(Continued)

*Primary Examiner* — Fernando Alcon
(74) *Attorney, Agent, or Firm* — Sughrue Mion, PLLC (57) ABSTRACT

Multiple light sources are configured to emit light to be used for range-image capturing. An electronic component is associated with operations of the light sources. A shield member is configured to block spatial propagation of noise with respect to the electronic component. An optical member has multiple lenses allowing passage of the light. The shield member is formed with multiple openings. The openings are arranged so as to allow at least a portion of light emitted from each of the light sources to pass toward an associated one of the lenses.

7 Claims, 5 Drawing Sheets

(51) Int. Cl.
*G01S 17/89* (2020.01)
*G06T 7/521* (2017.01)

(58) Field of Classification Search
CPC ..... G01S 17/894; G01S 17/931; G06T 7/521; G06T 2207/10028
See application file for complete search history.

(56) References Cited

U.S. PATENT DOCUMENTS

| | | |
|---|---|---|
| 2016/0216503 A1 | 7/2016 | Kim et al. |
| 2017/0299854 A1 | 10/2017 | Kim et al. |
| 2018/0352651 A1* | 12/2018 | Tazzoli ................. H05K 1/115 |
| 2019/0049712 A1 | 2/2019 | Kim et al. |
| 2019/0265171 A1 | 8/2019 | Kato et al. |
| 2019/0317311 A1 | 10/2019 | Kim et al. |
| 2020/0036913 A1* | 1/2020 | Asano ................... H04N 25/70 |
| 2020/0301012 A1 | 9/2020 | Yamamoto et al. |
| 2021/0013703 A1 | 1/2021 | Numata et al. |
| 2021/0041534 A1 | 2/2021 | Egawa |
| 2021/0320218 A1* | 10/2021 | Imoto ................. H10F 39/8063 |
| 2021/0373155 A1* | 12/2021 | Nagai ................... G01S 7/4861 |
| 2023/0020189 A1* | 1/2023 | Park ...................... G02B 3/0056 |
| 2023/0194708 A1* | 6/2023 | Wang ...................... H02B 1/00 359/196.1 |
| 2023/0239558 A1* | 7/2023 | Hill ....................... G06F 1/1635 348/371 |
| 2023/0388612 A1* | 11/2023 | Kano ..................... G02B 5/005 |

FOREIGN PATENT DOCUMENTS

| | | |
|---|---|---|
| JP | 2009-257983 A | 11/2009 |
| WO | 2018/051906 A1 | 3/2018 |

OTHER PUBLICATIONS

Search Report issued on Sep. 13, 2022 by International Searching Authority in International Application No. PCT/JP2022/030134.
Written Opinion issued on Sep. 13, 2022 by International Searching Authority in International Application No. PCT/JP2022/030134.

* cited by examiner

LIGHT EMITTING DEVICE, RANGE-IMAGE CAPTURING DEVICE, AND MONITORING DEVICE

CROSS-REFERENCE TO RELATED APPLICATIONS

This application is a National Phase Entry of PCT International Application No. PCT/JP2022/030134 filed on Aug. 5, 2022, which claims priority to Japanese Patent Application No. 2021-129919 filed on Aug. 6, 2021, the contents which are incorporated herein by reference in their entirety.

FIELD

The presently disclosed subject matter relates to a light emitting device including multiple light sources for emitting light used for range-image capturing. The presently disclosed subject matter also relates to a range-image capturing device and a monitoring device each of which includes the light emitting device.

BACKGROUND

Patent Document 1 discloses a range-image capturing device adapted to be installed in a vehicle which is an example of a monitoring device. The range-image capturing device includes a light emitting device, an image capturing device, and a computing device. The light emitting device emits light toward an area ahead of the vehicle, which is an example of a monitoring area. The image capturing device captures an image of an object situating in the area based on light reflected by the object. The computing device calculates a distance to the object based on a time period from time when the light is emitted from the light emitting device to time when the light is incident on the image capturing device.

CITATION LIST

Patent Document

Patent Document 1: Japanese Patent Publication No. 2009-257983 A

SUMMARY OF THE INVENTION

Technical Problem

It is demanded to improve a light distribution property of emitted light while suppressing an increase in the size of a light emitting device provided with multiple light sources for range-image capturing.

Solution to Problem

A first illustrative aspect of the presently disclosed subject matter provides a light emitting device, comprising:
multiple light sources configured to emit light to be used for range-image capturing,
an electronic component associated with operations of the light sources;
a shield member configured to block spatial propagation of noise with respect to the electronic component; and
an optical member having multiple lenses allowing passage of the light,
wherein the shield member is formed with multiple openings; and
wherein the multiple openings are arranged so as to allow at least a portion of light emitted from each of the light sources to pass toward an associated one of the lenses.

A second illustrative aspect of the presently disclosed subject matter provides a range-image capturing device, comprising:
the light emitting device according to the first illustrative aspect;
an image capturing device configured to capture an image of a subject based on the light reflected by the subject; and
a computing device configured to calculate a distance to the subject based on a time period from time when the light is emitted from the light emitting device to time when the light is incident on the image capturing device.

A third illustrative aspect of the presently disclosed subject matter provides a monitoring device, comprising the range-image device according to the second illustrative aspect, and configured to cause the light emitting device to emit the light toward a prescribed monitoring area.

The multiple light sources are used to supply light for the range-image capturing to a wider subject area. Since a final light distribution pattern is formed by the composition of the light emitted from the respective light sources, the optical conditions to be considered in order to obtain a desired light distribution property would be complicated. In addition, in order to suppress an increase in the size of the light emitting device, the interval between the light sources and the interval between the lenses tend to be small. This increases the possibility that a portion of the light emitted from one light source enters another lens adjacent to the lens associated with the one light source. In this case, unexpected deviations from the desired light distribution property would be occurred.

According to the configuration of each of the above illustrative aspects, among the light emitted from one light source, partial light that may be incident on a lens different from the lens associated with one light source is blocked from traveling by the shield member. As a result, individual light distribution properties obtained by the light sources and the lens corresponding to each other in the one-by-one manner can be reflected in the final composite light distribution pattern, so that the optical conditions to be considered in order to obtain a desired light distribution property can be simplified. In addition, since the multiple openings through which at least a portion of the light emitted from each of the multiple light sources is passed toward only an associated one of the multiple lenses is formed as a portion of the shield member used for shielding the spatial propagation of the noise with respect to the electronic component, it is possible to suppress an increase in the number of components while enhancing efficiency of spatial arrangement. Accordingly, it is possible to improve the light distribution property of the emitted light while suppressing an increase in the size of the light emitting device provided with the multiple light sources for the range-image capturing.

DESCRIPTION OF EMBODIMENTS

Examples of embodiments will be described below in detail with reference to the accompanying drawings. In each of the drawings used in the following descriptions, the scale is changed as required in order to make each member have a recognizable size.

Figure 1:
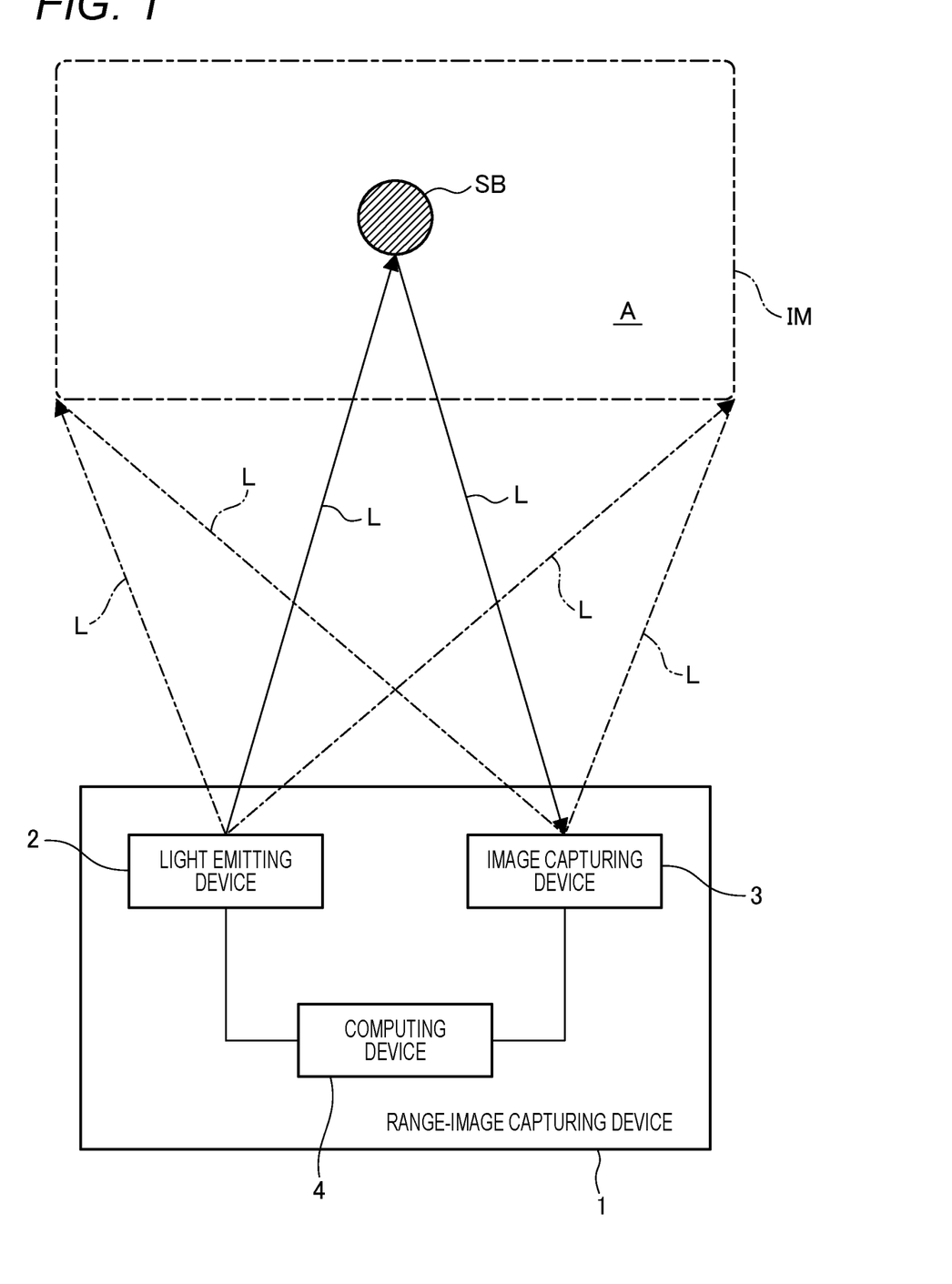
FIG. 1 illustrates a configuration of a range-image capturing device according to one embodiment.

FIG. 1 illustrates a functional configuration of a range-image capturing device 1 according to one embodiment. The range-image capturing device 1 is a device that acquires not only an image IM into which a subject SB situating in a subject area A is captured but also information as to a distance to the subject SB.

The range-image capturing device 1 includes a light emitting device 2. The light emitting device 2 includes a light source that emits light L toward the subject area A. Examples of the light source may include a semiconductor light emitting element such as a light emitting diode (LED), a laser diode (LD), and the like.

The range-image capturing device 1 includes an image capturing device 3. The image capturing device 3 includes a light receiving element that outputs a signal corresponding to light coming from the subject area A. Examples of the light receiving element may include a CMOS image sensor. The image capturing device 3 is configured to capture an image of the subject SB based on the light L reflected by the subject SB.

The range-image capturing device 1 includes a computing device 4. The computing device 4 is configured to calculate a distance to the subject SB based on a time period from time when the light L is emitted from the light emitting device 2 to time when the light L is incident on the image capturing device 3. The TOF (Time of Flight) method is used for calculating the distance. Either the direct TOF method or the indirect TOF method may be used. Since the TOF method itself is well known, detailed descriptions thereof will be omitted.

Figure 2:
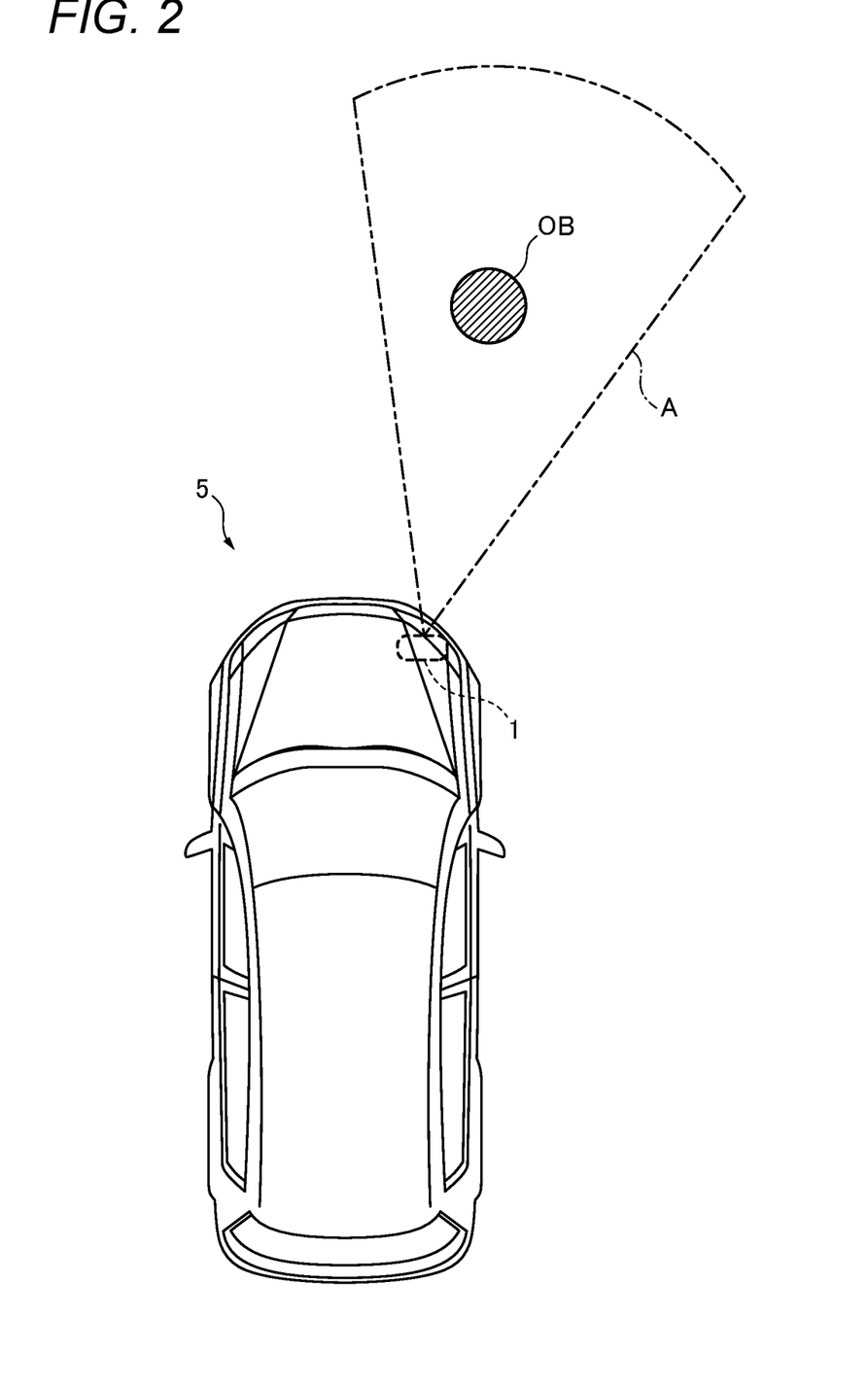
FIG. 2 illustrates a vehicle in which the range-image capturing device of FIG. 1 is to be installed.

As illustrated in FIG. 2, the range-image capturing device 1 may be installed in a vehicle 5. The position of the range-image capturing device 1 in the vehicle 5 is appropriately determined in accordance with the position of the subject area A. In this example, the range-image capturing device 1 is installed in a right front corner portion of the vehicle 5. As a result, it is possible to monitor the subject area A set around the right corner portion of the vehicle 5. For example, it is possible to monitor the presence or absence of an object OB requiring an avoidance operation of the vehicle 5. The vehicle 5 is an example of a mobility. The vehicle 5 is an example of a monitoring device. The subject area A is an example of a monitoring area.

Figure 3:
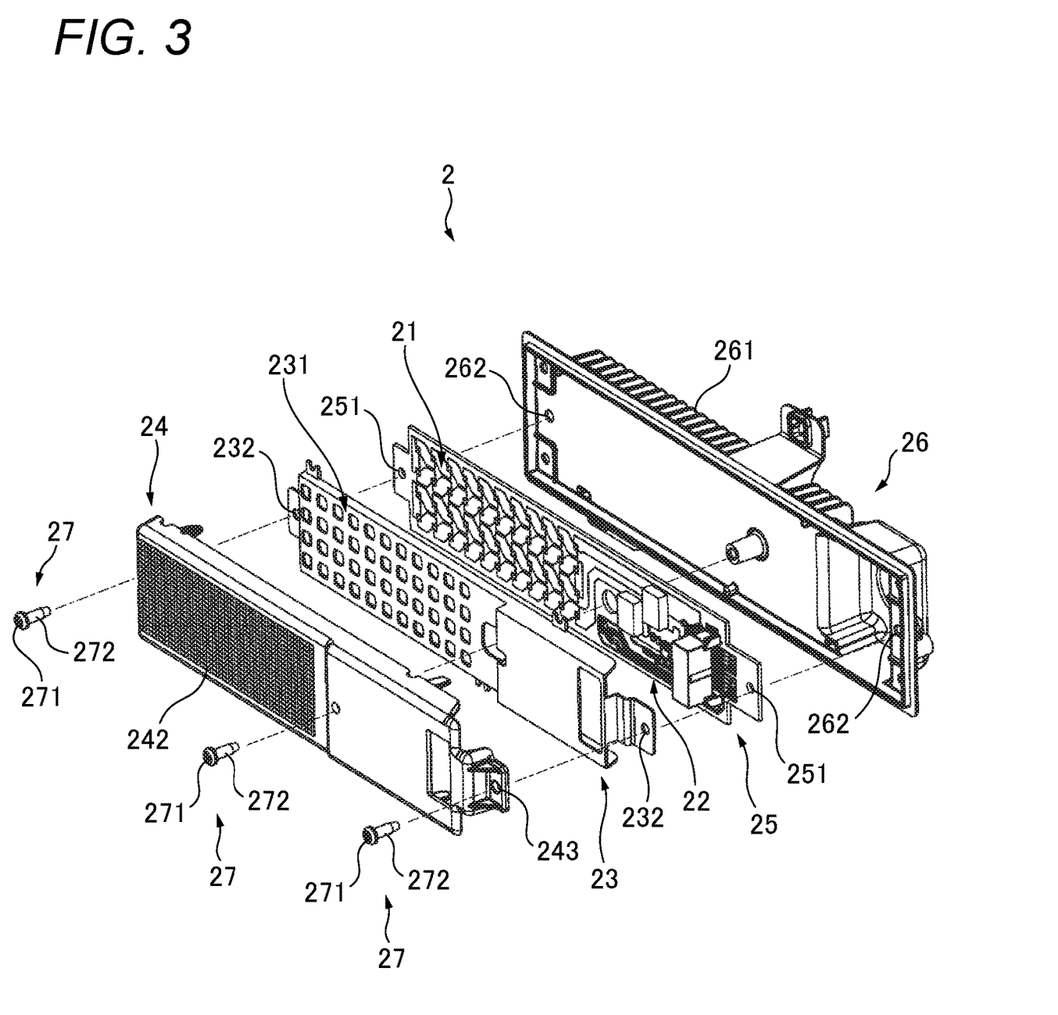
FIG. 3 is an exploded perspective view illustrating a configuration of a light emitting device of FIG. 1.

As illustrated in FIG. 3, the light emitting device 2 includes multiple light sources 21. The light sources 21 are arranged so as to form a two-dimensional array. Each of the light sources 21 is configured to emit light used for range-image capturing. In the present embodiment, the light used for the range-image capturing includes an infrared wavelength range. In other words, the light used for the range-image capturing is non-visible light.

The light emitting device 2 includes an electronic component 22. The electronic component 22 includes various elements associated with the operation of the light sources 21. Examples of such elements include a switching element for controlling turning on/off of each of the light sources 21, a temperature sensor for sensing a temperature of an area where the light sources 21 are disposed, and the like.

The light emitting device 2 includes a shield member 23. The shield member 23 is disposed so as to block spatial propagation of noise with respect to the electronic component 22. The noise includes electromagnetic noise and electrostatic noise. The shield member 23 may be formed of a material having conductivity.

The shield member 23 has multiple openings 231. The multiple openings 231 are arranged to form a two-dimensional array. The number of the openings 231 coincides with the number of the light sources 21. In other words, each of the openings 231 is associated with one of the light sources 21.

Figure 4:
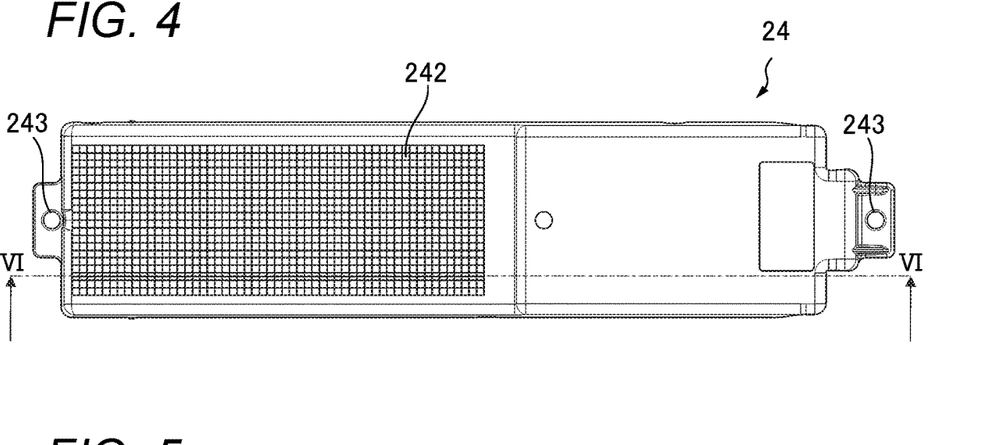
FIG. 4 is a front view illustrating an optical member of FIG. 3.
Figure 5:
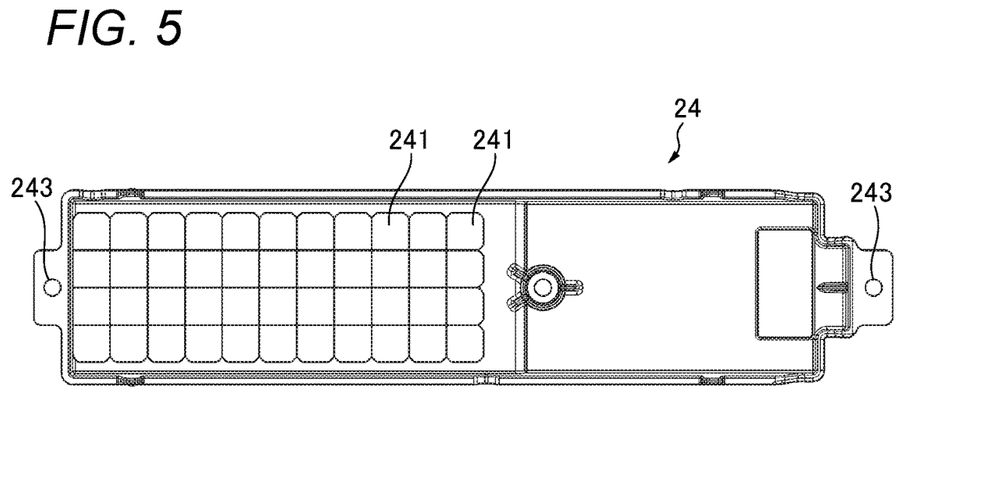
FIG. 5 is a rear view illustrating the optical member of FIG. 3.
Figure 6:
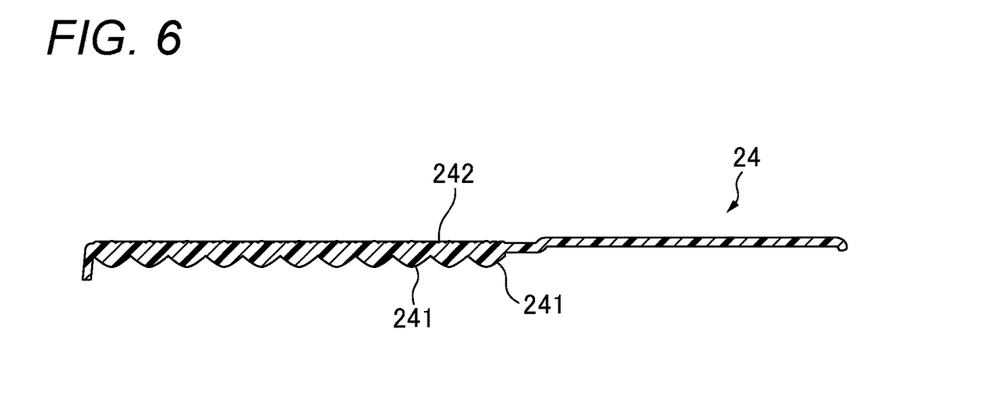
FIG. 6 illustrates a cross section viewed from an arrowed direction along a line VI-VI of FIG. 4.

The light emitting device 2 includes an optical member 24. FIG. 4 illustrates an appearance of the optical member 24 as viewed from front. FIG. 5 illustrates an appearance of the optical member 24 as viewed from back. A back face of the optical member 24 faces the shield member 23. FIG. 6 illustrates a cross section of the optical member 24 as viewed from the arrowed direction along the line VI-VI in FIG. 4.

As illustrated in FIGS. 5 and 6, the optical member 24 includes multiple lenses 241. The multiple lenses 241 are arranged to form a two-dimensional array. The multiple lenses 241 are configured to allow passage of light emitted from the multiple light sources 21. The number of the lenses 241 coincides with the number of the openings 231. In other words, each of the lenses 241 is associated with one of the openings 231 and one of the light sources 21.

As illustrated in FIGS. 3, 4, and 6, the optical member 24 includes an emission face 242. The emission face 242 is formed with fine irregularities, and is configured to scatter light passing through the lenses 241. As a result, light L as composite light emitted from the light emitting device 2 is obtained.

Figure 7:
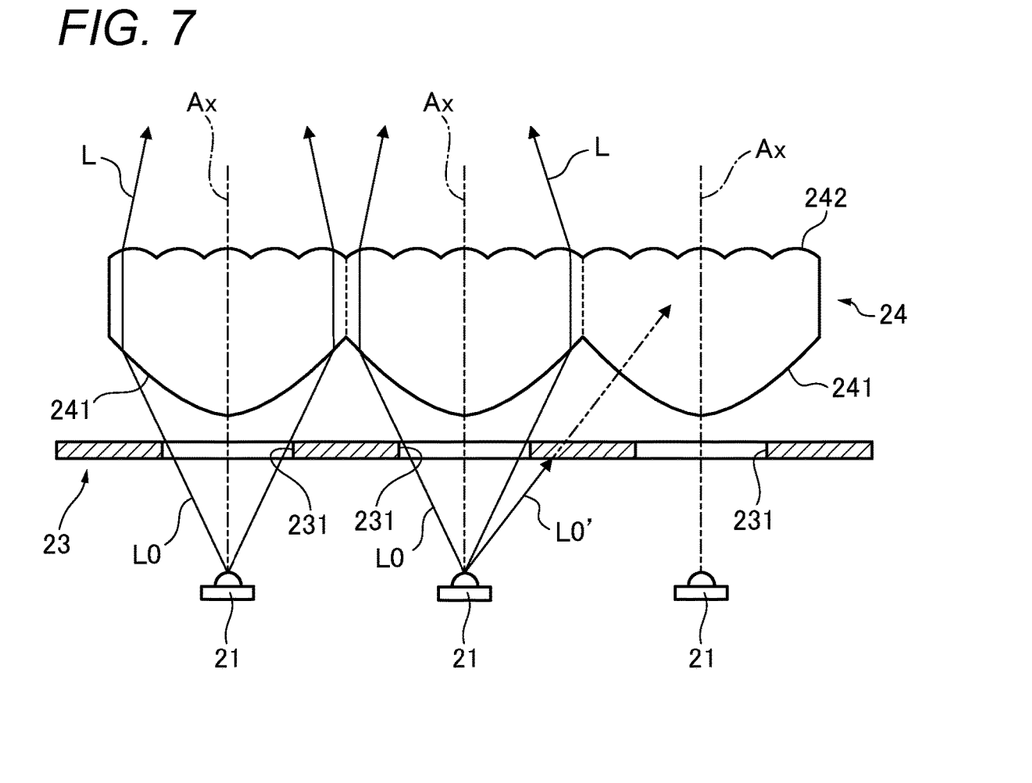
FIG. 7 illustrates a locational relationship among a light source, the optical member, and a shield member of FIG. 3.

FIG. 7 is an enlarged view of a portion of the shield member 23 and a portion of the optical member 24. The multiple openings 231 are arranged to allow at least a portion of light LO emitted from each of the multiple light sources 21 to pass toward an associated one of the multiple lenses 241.

Specifically, the shape and size of each opening 231 are determined so that the light L passing through one opening 231 does not enter another lens 241 adjacent to one of the lenses 241 associated with the one opening 231. The distance between an incident face of each lens 241 and the shield member 23 in a direction along an optical axis AX of each lens 241 is also determined so as to satisfy the above requirement. As a result, among the light LO emitted from one light source 21, partial light LO' that may be incident on another lens 241 adjacent to one of the lenses 241 associated with the one light source 21 is blocked from traveling by the shield member 23.

The multiple light sources 21 are used to supply light L for the range-image capturing to a wider subject area A. Since a final light distribution pattern is formed by the composition of the light LO emitted from the respective light sources 21, the optical conditions to be considered in order to obtain a desired light distribution property would be complicated. In addition, in order to suppress an increase in the size of the light emitting device 2, the interval between the light sources 21 and the interval between the lenses 241 tend to be small. This increases the possibility that a portion of the light LO emitted from one light source 21 enters another lens 241 adjacent to the lens 241 associated with the one light source 21. In this case, unexpected deviations from the desired light distribution property would be occurred.

According to the configuration of the present embodiment, among the light LO emitted from one light source 21, partial light LO' that may be incident on a lens 241 different from the lens 241 associated with one light source 21 is blocked from traveling by the shield member 23. As a result, individual light distribution properties obtained by the light sources 21 and the lens 241 corresponding to each other in the one-by-one manner can be reflected in the final composite light distribution pattern, so that the optical conditions to be considered in order to obtain a desired light distribution property can be simplified. In addition, since the multiple openings 231 through which at least a portion of the light LO emitted from each of the multiple light sources 21 is passed toward only an associated one of the multiple lenses 241 is formed as a portion of the shield member 23 used for shielding the spatial propagation of the noise with respect to the electronic component 22, it is possible to suppress an increase in the number of components while enhancing efficiency of spatial arrangement. Accordingly, it is possible to improve the light distribution property of the emitted light L while suppressing an increase in the size of the light emitting device 2 provided with the multiple light sources 21 for the range-image capturing.

As illustrated in FIG. 3, the light emitting device 2 includes a circuit board 25. The light sources 21 and the electronic component 22 are mounted on a common circuit board 25. The light sources 21 and the electronic component 22 are electrically connected through circuit wirings formed on the circuit board 25. The shield member 23 is disposed between the optical member 24 and the circuit board 25 to allow the passage of the light LO through the multiple openings 231 and to perform the noise blocking with respect to the electronic component 22.

According to such a configuration, it is possible to further suppress an increase in the number of components while further increasing the efficiency of spatial arrangement. However, as long as the shield member 23 is interposed behind the optical member 24, a circuit board on which the multiple light sources 21 are mounted and a circuit board on which the electronic component 22 is mounted may be independent from each other.

The light emitting device 2 includes a heat sink 26. The heat sink 26 is a component for dissipating heat generated from the multiple light sources 21 and the electronic component 22. The heat sink 26 includes multiple fins 261 for promoting heat dissipation.

The light emitting device 2 includes a fastening member 27. The fastening member 27 is a component for fastening the shield member 23, the optical member 24, and the circuit board 25 to the heat sink 26. The fastening member 27 has a head portion 271 and a shaft portion 272. The fastening member 27 may be, for example, a screw having screw grooves formed in the shaft portion 272.

A first through hole 251 is formed in the circuit board 25. The shield member 23 is formed with a second through hole 232. The optical member 24 is formed with a third through hole 243. The circuit board 25, the shield member 23, and the optical member 24 are arranged in this order as viewed from the heat sink 26 so that the first through hole 251, the second through hole 232, and the third through hole 243 are arranged concentrically.

Figure 8:
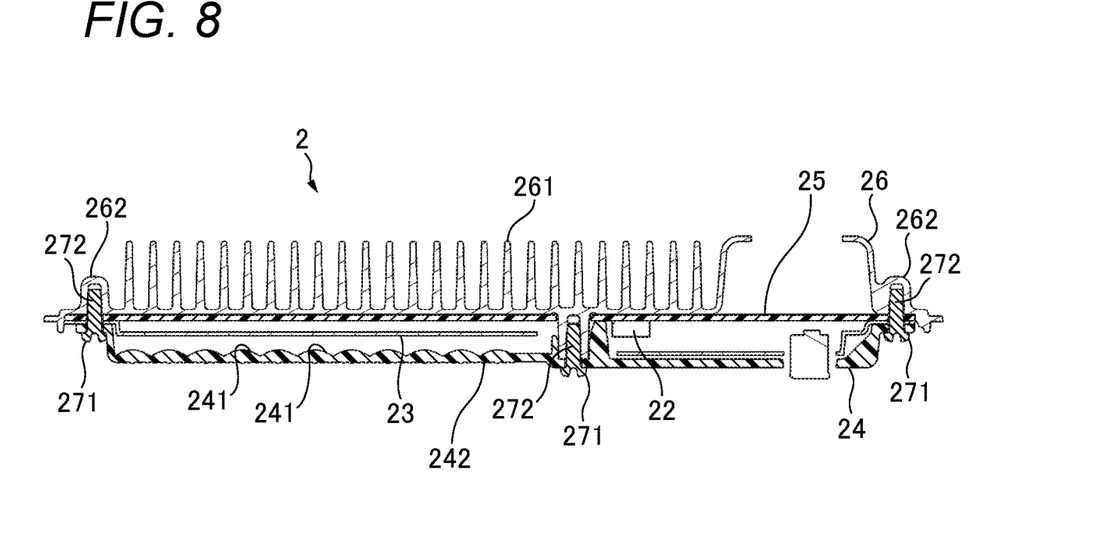
FIG. 8 illustrates an assembled state of the light emitting device of FIG. 3.

As illustrated in FIG. 8, the fastening member 27 is attached from the side of the optical member 24 so that the shaft portion 272 is disposed in the first through hole 251, the second through hole 232, and the third through hole 243. When the shaft portion 272 is screwed into a receiving portion 262 formed in the heat sink 26, the head portion 271 presses the optical member 24 toward the heat sink 26. Accordingly, the shield member 23 and the circuit board 25 are also pressed toward the heat sink 26, so that the fastening is performed.

According to such a configuration, it is possible to easily maintain the optical arrangement relationship among the light sources 21, the openings 231, and the lenses 241 illustrated in FIG. 7. Accordingly, it is possible to suppress deterioration of the light distribution property of the light emitting device 2.

Each configuration described above is merely an example for facilitating understanding of the presently disclosed subject matter. Each exemplary configuration may be appropriately modified or combined with another configuration within the scope of the presently disclosed subject matter.

In the above embodiment, the light L used for the range-image capturing is non-visible light. However, visible light may be used for the range-image capturing.

The light emitting device 2, the image capturing device 3, and the computing device 4 constituting the range-image capturing device 1 do not have to be housed in a common housing. At least one of the image capturing device 3 and the computing device 4 may be disposed at an appropriate position in the vehicle 5 independently of the light emitting device 2.

The range-image capturing device 1 may be installed in a mobility other than the vehicle 5. Examples of other mobilities may include railways, flying objects, aircrafts, and ships. The mobility may not require a driver. The mobility is also an example of the monitoring device.

The range-image capturing device 1 does not have to be installed in a mobility. As an example, the range-image capturing device 1 may be installed in a traffic infrastructure facility such as a street lamp or a traffic light. In this case, the subject area A may be set to include a road. As another example, the range-image capturing device 1 can be applied to a security system adapted to be installed in a house, a facility or the like to detect a subject entering a subject area A.

The invention claimed is:

1. A light emitting device, comprising:
    multiple light sources configured to emit light to be used for range-image capturing;
    an electronic component associated with operations of the light sources;
    a shield member configured to block spatial propagation of noise with respect to the electronic component; and
    an optical member having multiple lenses allowing passage of the light,
    wherein the shield member is formed with multiple openings; and
    wherein the multiple openings are arranged so as to allow at least a portion of light emitted from each of the light sources to pass toward an associated one of the lenses.

2. The light emitting device according to claim 1, further comprising:
    a circuit board on which the electronic component is mounted, wherein the light sources are multiple semiconductor light emitting elements mounted on the circuit board.

3. The light emitting device according to claim 2, further comprising:
a heat sink configured to dissipate heat generated form the light sources and the electronic component; and
a fastening member having a shaft portion,
wherein a first through hole formed in the circuit board, a second through hole formed in the shield member, and a third through hole formed in the optical member are concentrically arranged; and
wherein the shaft portion of the fastening member is disposed in the first through hole, the second through hole, and the third through hole, so that the circuit board, the shield member, and the optical member are fastened to the heat sink.

4. The light emitting device according to claim 1, wherein the light is invisible light.

5. A range-image capturing device, comprising:
a light emitting device, including:
multiple light sources configured to emit light to be used for range-image capturing;
an electronic component associated with operations of the light sources;
a shield member configured to block spatial propagation of noise with respect to the electronic component; and
an optical member having multiple lenses allowing passage of the light;
an image capturing device configured to capture an image of a subject based on the light reflected by the subject; and
a computing device configured to calculate a distance to the subject based on a time period from time when the light is emitted from the light emitting device to time when the light is incident on the image capturing device,
wherein the shield member is formed with multiple openings; and
wherein the multiple openings are arranged so as to allow at least a portion of light emitted from each of the light sources to pass toward an associated one of the lenses.

6. A monitoring device, comprising:
a light emitting device, including:
multiple light sources configured to emit light to be used for range-image capturing;
an electronic component associated with operations of the light sources;
a shield member configured to block spatial propagation of noise with respect to the electronic component; and
an optical member having multiple lenses allowing passage of the light;
an image capturing device configured to capture an image of a subject based on the light reflected by the subject; and
a computing device configured to calculate a distance to the subject based on a time period from time when the light is emitted from the light emitting device to time when the light is incident on the image capturing device,
wherein the shield member is formed with multiple openings,
wherein the multiple openings are arranged so as to allow at least a portion of light emitted from each of the light sources to pass toward an associated one of the lenses; and
wherein the monitoring device is configured to cause the light emitting device to emit the light toward a prescribed monitoring area.

7. The monitoring device according to claim 6, being a mobility.

* * * * *